United States Patent
Morita (10) Patent No.: US 6,178,780 B1
(45) Date of Patent: *Jan. 30, 2001

(54) METHOD OF SOLUTION DOPING A SOL GEL BODY VIA IMMERSION

(75) Inventor: Yuko Morita, Hachiohji (JP)

(73) Assignee: Olympus Optical Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/867,043

(22) Filed: Jun. 2, 1997

Related U.S. Application Data (63) Continuation of application No. 08/339,695, filed on Nov. 14, 1994, now abandoned.

(30) Foreign Application Priority Data

Nov. 12, 1993 (JP) .................................................. 5-307293
Jun. 13, 1994 (JP) .................................................. 6-154254

(51) Int. Cl.$^7$ ................................................ C03B 37/016

(52) U.S. Cl. ................................ 65/395; 65/399; 65/529; 118/429

(58) Field of Search ................................ 137/206, 209; 118/429; 65/529, 484, 399, 395

(56) References Cited

U.S. PATENT DOCUMENTS

| | | | |
|---|---|---|---|
| 2,946,700 | * 7/1960 | Day | 118/429 |
| 3,138,483 | * 6/1964 | Dettling | 118/429 |
| 3,599,601 | * 8/1971 | Ishikawa | 118/429 |
| 3,938,974 | 2/1976 | Macedo et al. . | |
| 4,302,231 | 11/1981 | Macedo et al. . | |
| 4,682,995 | * 7/1987 | Clasen | 65/395 |
| 4,686,195 | 8/1987 | Yamane . | |
| 4,816,051 | * 3/1989 | Clasen | 65/395 |
| 4,964,366 | * 10/1990 | Kurokawa | 118/429 |
| 5,474,588 | * 12/1995 | Tanaka | 65/399 |
| 5,558,714 | * 9/1996 | Watanabe | 118/429 |

FOREIGN PATENT DOCUMENTS

| | | | |
|---|---|---|---|
| 56-32344 | * 4/1981 | (JP) | 65/395 |
| 58-199748 | * 11/1983 | (JP) | 65/399 |
| 4-254420 | * 9/1992 | (JP) | 65/395 |
| 5-170471 | * 7/1993 | (JP) | 65/399 |
| 5170471 | * 7/1993 | (JP) | 65/399 |

OTHER PUBLICATIONS

Yamane, et al: "Gradient–Index Glass Rods of PbO–$K_2O$–$B_2O_3$–$SiO_2$ System Prepared by the Sol–Gel Process" Journal of Non–Crystalline Solids–100 (1988) 506–510.

An English Abstract of Japanese 63–95124 No date.
An English Abstract of Japanese 62–226832 No date.

* cited by examiner

Primary Examiner—John Hoffmann
(74) Attorney, Agent, or Firm—Pillsbury Madison & Sutro LLP (57) ABSTRACT

A porous body 4 and a first immersing solution 6 are put in a vessel 5 in proportions such that the whole of the porous body 4 is immersed in the immersing solution, and the immersing is conducted for an arbitrary period of time. The vessel 5 is formed so as to have a depth greater than the height of the porous body 4. A vessel-capacity changing device 7 is inserted in the vessel 5. The first immersing solution 6 overflows from the interstice between the vessel-capacity changing device 7 and the vessel 5. A second immersing solution 8 is poured through a charging port, and simultaneously the vessel-capacity changing device 7 is lifted to thereby remove the same from the immersing solution. Thus, the porous body 4 is immersed in the second immersing solution 8 without being exposed to the outside air to thereby complete solution replacement. The immersing of the porous body can be effected safely, securely and at a lowered cost without damaging the porous body.

7 Claims, 7 Drawing Sheets

METHOD OF SOLUTION DOPING A SOL GEL BODY VIA IMMERSION

This is a continuation of application Ser. No. 08/339,695, filed on Nov. 14, 1994, which was abandoned.

BACKGROUND OF THE INVENTION

1. Field of the Invention

The present invention relates to an immersing apparatus for immersing a porous body in liquids in a plurality of stages, which is used, for example, in the production of a glass via a porous body. Also, the present invention relates to a method for producing a glass with the use of the above immersing apparatus according to the sol-gel process.

2. Discussion of Related Art

In the art, various immersing-related methods are generally known, which include one in which pores of a porous glass are stuffed with a metal salt component by immersing the porous glass in a solution (U.S. Pat. Nos. 3,938,974 and 4,302,231), and another in which a porous gel produced according to the sol-gel process and having pores in which a metal salt solution is enclosed is immersed in a solvent in which the metal salt is sparingly soluble to thereby crystallize the metal salt into microcrystals in the pores of the porous gel (J. Non-Crystalline Solids 100 (1988) 506–510). The known methods further include one comprising preparing a silica sol containing at least one metal component, gelling the sol, immersing the wet gel in a solution capable of dissolving or dispersing the above metal component, such as acids, to thereby leach out the metal component capable of providing a refractive index distribution so that the metal component is provided with a concentration distribution, and immersing the gel in a silicon alkoxide solution, followed by drying and sintering (Japanese Unexamined Patent Application Publication 95124/1988).

The above J. Non-Crystalline Solids 100 (1988) 506–510 further describes a method comprising immersing a gel in a solvent having a low surface tension prior to drying to thereby prevent cracking at the time of drying.

As described above, various effects are exhibited by sequentially immersing a porous glass or a porous gel in a plurality of solutions so as to change a solvent system within the pores of the porous glass or porous gel.

Conventionally, the transfer of the immersed porous body from a given solution to a subsequent solution has generally been conducted by picking up the porous body from the given solution with the use of a tool such as a basket or a pair of tweezers and immersing the picked porous body in the subsequent solution placed in a separate vessel.

Figures 7, 8:
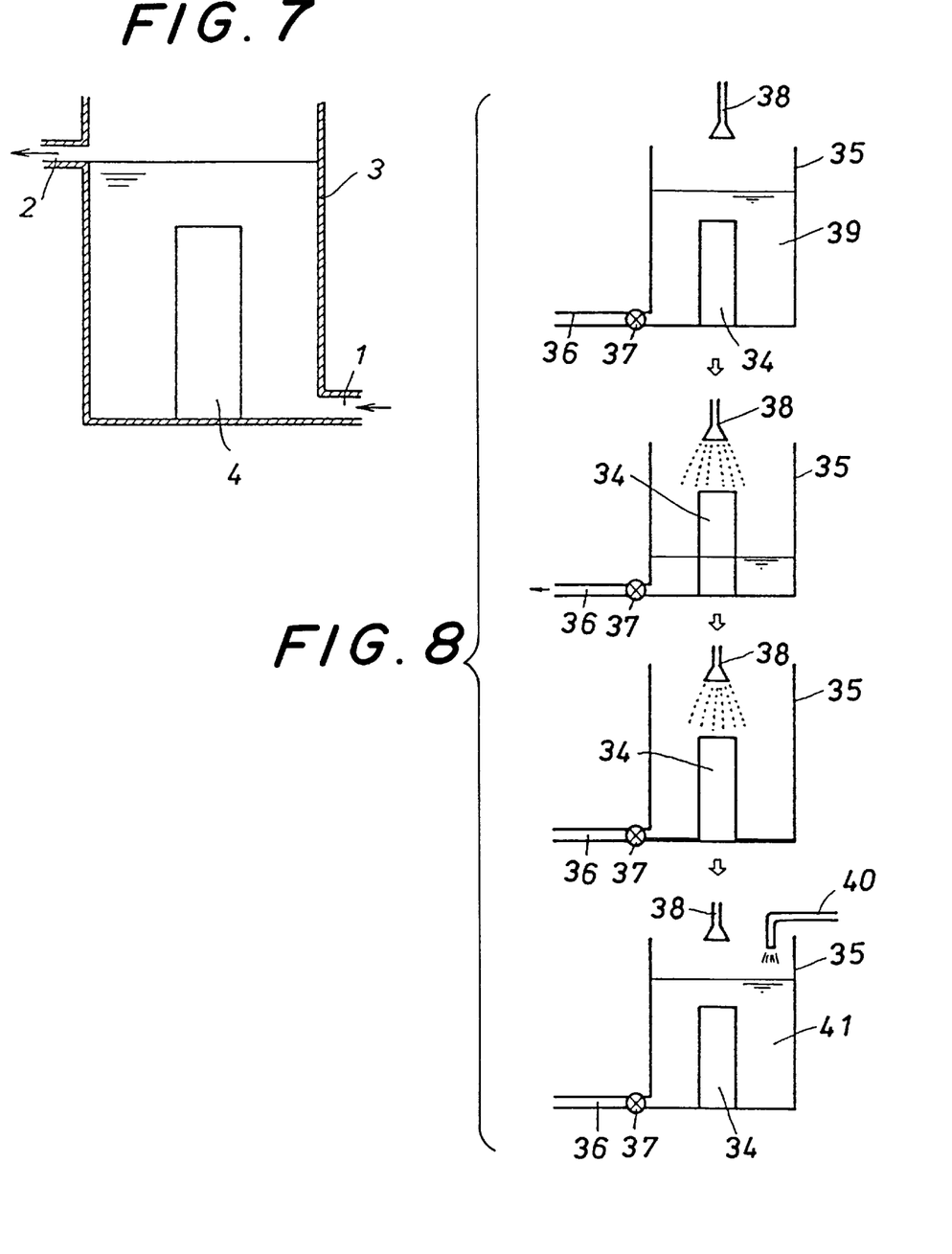
FIG. 7 is a longitudinal section of the immersing apparatus of the prior art.
FIG. 8 is a step flow diagram showing the procedure of solvent replacement with the use of an apparatus of the present invention to be employed in the glass production according to the sol-gel process.

Moreover, Japanese Unexamined Patent Application Publication 226832/1987 discloses a method comprising leaching a porous body 4 with the use of a vessel 3 provided with an inlet port 1 at a lower part of the vessel and a discharge port 2 at an upper part of the vessel as shown in FIG. 7.

However, the above prior art has the following drawbacks with respect to the handling of the porous body (such as porous glass and gel produced by the sol-gel process) when the immersing of the porous body is conducted in multiple stages.

First, when a strong force is applied to the porous body being transferred, the porous body is likely to suffer from partial collapse or flaw because it is generally brittle. Consequently, the greatest possible care should be taken at the time of the transfer of the porous body. Conventional tools are, for example, tweezers, tongs like the same and baskets. Even if the greatest possible care is taken with the use of such conventional tools, the accident of porous body breakage cannot be avoided although the frequency of porous body breakage accidents may be reduced.

Secondly, when the porous body to be treated in multiple stages is picked out of the solution for transferring the same into the subsequent solution, the solvent of the solution, e.g., alcohol, filling the pores of the porous body having been picked up in the air is rapidly evaporated, so that the porous body suffers from a stress due to the surface tension of the solution within the pores, thereby being likely to be cracked. A measure comprising providing an atmosphere saturated with the solvent over the vessel accommodating the immersing solution would be considered for pre venting the above rapid evaporation of the solvent. However, when the immersing is conducted in multiple stages, the above atmosphere control is very inconvenient and costly.

When a solvent having a low surface tension, such as acetone, methanol and ether, is used as the solvent incorporated in the gel, drying gradually proceeds so that cracking is less likely to occur, as long as the drying speed is suitable. However, this solvent has a low boiling point and thus a high volatility, so that it has a drawback that rapid drying of only the surface of the gel is advanced to thereby cause the gel to suffer from cracking due to a stress applied thereby.

Therefore, the immersing treatment in multiple stages has inevitably been accompanied by the problems including the damaging of the porous body during the holding and transfer thereof and the complexity of the atmosphere control for preventing the cracking due to the solvent evaporation during the transfer of the porous body.

The porous body includes porous glasses produced by the phase separation—heat treatment and the acid leaching treatment, and porous gels produced by the sol-gel process. In particular, the porous gels produced by the sol-gel process have the drawback that the gel skeleton is so weak that cracking is likely to occur.

On the other hand, the method comprising changing the solvent introduced through an inlet port 1 to thereby continuously change the solvent mixing ratio, without taking out the porous body from the solution, by the use of an apparatus (see FIG. 7) as disclosed in, for example, Japanese Unexamined Patent Application Publication 226832/1987, has drawbacks in that the solvent replacement is inevitably slow, and in that, due to the mixing of two different solutions, a large volume of solvent is required for complete conversion to the subsequent solution to thereby incur a high cost.

SUMMARY OF THE INVENTION

The present invention has been made with a view toward obviating the drawbacks of the prior art including the damaging of the porous body during the transfer thereof, the cracking of the surface of the porous body caused by the drying thereof and the consumption of a large volume of solvent in the method comprising continuously changing the solvent mixing ratio.

It is an object of the present invention to provide a porous body immersing apparatus with which the immersing treatment of the porous body can be performed safely, securely and at a lowered cost without the damaging of the porous body. Another object of the present invention is to provide a method for producing a desirable glass with the use of the above immersing apparatus according to the sol-gel process safely, securely and at a lowered cost.

The foregoing and other objects, features and advantages of the present invention will become apparent from the following detailed description and appended claims taken in connection with the accompanying drawings.

BRIEF DESCRIPTION OF THE DRAWINGS

In the drawings.

In the separate figures, parts having the same function are marked with the same part numbers.

DETAILED DESCRIPTION OF THE INVENTION

For attaining the above objects, in one aspect of the present invention, there is provided a porous body immersing apparatus for use in a step of sequentially immersing a porous body in first and second liquids, which comprises:

a vessel having a depth greater than the height of the porous body, in which the porous body is disposed and in which the first and second liquids are poured, means for substantially changing the capacity of the vessel, a liquid charging port through which the second liquid is charged into the vessel, and a liquid discharge port through which the first liquid is discharged from the vessel.

The first and second liquids to be used in the porous body immersing apparatus of the present invention may be of different types, or may be old and fresh liquids of the same type, respectively.

In one form of porous body immersing apparatus according to the present invention, the vessel-capacity changing means may undergo insertion into and removal from the vessel to thereby change the capacity of the vessel, so that, when the vessel-capacity changing means is inserted into the vessel, the first liquid is discharged through the liquid discharge port from the vessel, and when the vessel-capacity changing means is removed from the vessel, the second liquid is charged through the liquid charging port into the vessel.

The above liquid discharge port may be disposed at the vessel-capacity changing means or in the vessel.

Further, the liquid discharge port may be disposed at the vessel while the liquid charging port is disposed at the vessel-capacity changing means.

Alternatively, in the above one form of porous body immersing apparatus according to the present invention, the vessel-capacity changing means may be one capable of changing the capacity of the vessel by increase and decrease of the volume of the vessel-capacity changing means within the vessel, so that, when the volume of the vessel-volume changing means is increased, the first liquid is discharged through the liquid discharge port from the vessel, and when the volume of the vessel-capacity changing means is decreased, the second liquid is charged through the liquid charging port into the vessel.

The above liquid discharge port may be disposed at the vessel. Further, the liquid discharge port may be disposed at the vessel while the liquid charging port is disposed at the vessel-capacity changing means.

In the above porous body immersing apparatus according to the present invention, the volume of the vessel-capacity changing means may be increased by pouring the second liquid into the vessel-capacity changing means, so that the first liquid is discharged through the liquid discharge port from the vessel and then the second liquid is charged through the liquid charging port of the vessel-capacity changing means into the vessel.

The above porous body may be a gel produced by the sol-gel process.

The operation and function of the multiple-stage immersing using the immersing apparatus of the present invention will be described below.

First, description will be made with respect to the immersing with an apparatus provided with a device capable of vertically driving at least either of the vessel-capacity changing means and the vessel.

A porous body 4 and a first immersing solution (first liquid) 6 are put in a cylindrical bottomed vessel 5 as shown in FIG. 1 (a), the amount of the first immersing solution being one sufficient to immerse the whole of the porous body 4, and immersing is effected for a given period of time. The vessel 5 is shaped to have a depth greater than the height of the porous body 4. After the immersing for a given period of time, a vessel-capacity changing means 7 is inserted in the vessel 5 and immersed in the first immersing solution 6. The vessel-capacity changing means 7 is in the form of a cylinder having an outside diameter slightly smaller than the inside diameter of the vessel 5, which cylinder is provided at its core portion with a through hole 7a having a diameter slightly greater than the outside diameter of the porous body 4. Therefore, when the immersion of the vessel-capacity changing means 7 into the first immersing solution 6 is advanced in a fashion such that the porous body 4 is surrounded by the vessel-capacity changing means 7, the first immersing solution 6 contained in the vessel 5 overflows from the interstice between the vessel-capacity changing means 7 and the vessel 5. FIG. 1(c) is a view showing the completion of the discharge of the first immersing solution 6 achieved by the complete insertion of the vessel-capacity changing means 7 (to the bottom of the vessel 5). When the first immersing solution 6 is discharged by the above method, the surface level of the first immersing solution 6 is never lower than the top edge of the vessel 5, so that immersing of the porous body 4 can be performed without exposure of the surface of the porous body 4 to outside the first immersing solution 6. In the vessel 5, a small amount of the first immersing solution 6 remains in the interstices between the porous body 4 and the vessel-capacity changing means 7 and between the vessel-capacity changing means 7 and the vessel 5. However, as shown in FIG. 1(d), immersing of the porous body 4 without exposure thereof to the outside air in the second immersing solution 8 can be accomplished by pouring a second immersing solution (second liquid) 8 through a charging port while lifting the vessel-capacity changing means 7 to remove the same from the immersing solution. Thus, solution replacement is completed to fill the vessel 5 with the second immersing solution 8 (see FIG. 1(e)).

Similarly, a plurality of immersing solution re placements can be performed. Illustratively, the vessel-capacity changing means 7 is inserted into the vessel 5 having the (N−1)th immersing solution placed therein to thereby discharge the (N−1)th immersing solution, followed by pouring of the Nth immersing solution while lifting the vessel-capacity changing means 7 to thereby remove the same from the immersing solution. The solution replacements up to the Nth (N is a natural number of 2 or greater) immersing solution can be performed by repeating the above.

Next, description will be made with respect to the operation and function of the multiple-stage immersing using the immersing apparatus of the present invention provided with a vessel-capacity changing means whose volume is changeable.

A vessel-capacity changing means having been shrunk by extracting the air or liquid therefrom is placed, together with the (N−1)th immersing solution and the porous body, in the vessel. Gradual charging of the air, Nth immersing solution or other solution into the vessel-capacity changing means causes the vessel-capacity changing means to inflate so as to gain a volume sufficient to expel the (N−1)th immersing solution. The thus inflated vessel-capacity changing means easily fits the configuration of the porous body, so that the amount of the (N−1)th immersing solution remaining in the interstices defined by the porous body, the vessel-capacity changing means and the vessel can be minimized. Further, even if the above fitting is made, the porous body is advantageously less susceptible to flaws because a fluid is present inside the vessel-capacity changing means, so that local application of unnatural force can be avoided. Immersing solution replacement is completed by simultaneously conducting the charging of the Nth immersing solution into the vessel and the discharge of the air or solution from the vessel-capacity changing means, after the inflation of the vessel-capacity changing means so as to discharge the (N−1)th immersing solution.

Examples of the vessel-capacity changing means whose volume is changeable include bags, bellows and other variously shaped members from which the air or solution charged inside as mentioned above does not leak. Further, the vessel-capacity changing means may be a porous organic polymer capable of absorbing a liquid in a high swelling ratio.

In the discharge of the immersing solution from the vessel, it is requisite that the surface level of the immersing solution be not lower than the apex of the porous body. Accordingly, the depth of the vessel may be greater than the height of the porous body as in the previous immersing apparatus. Preferably, the vessel may be provided with at least one liquid passage port leading to outside the vessel. As long as the height of the liquid passage port is greater than the height of the immersed porous body, the surface level of the immersing solution is never lower than the top of the porous body. The surface level of the immersing solution may be regulated by disposing a plurality of liquid passage ports arranged along the height direction which may be freely closed or opened. Moreover, a float switch or other water level sensors may be employed to control so that the surface level of the immersing solution is not lower than the top of the porous body, thereby realizing arbitrary setting of the surface level.

The internal part of the vessel-capacity changing means may be either solid or hollow. When the vessel-capacity changing means is hollow, the vessel-capacity changing means may be provided with a solution discharge/charging valve which may be freely closed and opened and which extends from the hollow part of the vessel-capacity changing means toward the vessel. This valve brings about the following advantages.

FIG. 2 shows one form of apparatus provided with a hollow vessel-capacity changing means having a solution discharge/charging valve which extends from the hollow part of the vessel-capacity changing means toward the vessel.

A porous body 4 and a first immersing solution 6 are put in a vessel 5 as shown in FIG. 2 (a), the amount of the first immersing solution being one sufficient to immerse the whole of the porous body 4, and immersing is effected for a given period of time. Thereafter, a hollow vessel-capacity changing means 7 is inserted in the vessel 5 and immersed in the first immersing solution 6, as shown in FIG. 2 (b). Thus, the first immersing solution 6 contained in the vessel 5 is transferred via a solution discharge/charging valve 9 provided on the bottom of the vessel-capacity changing means 7 into the hollow part of the vessel-capacity changing means 7. FIG. 2 (c) is a view showing the completion of the transfer and discharge of the first immersing solution 6 from the vessel-capacity changing means 7, achieved by the complete insertion of the vessel-capacity changing means 7. Then, as shown in FIG. 2 (d), the solution discharge/charging valve 9 is closed, and a second immersing solution 8 is poured into the vessel 5 through a charging port while removing the vessel-capacity changing means 7. Thus, the porous body 4 is immersed in the second immersing solution 8 without exposure to the outside air. In the above manner, solution replacement to fill the vessel with the second immersing solution 8 is completed (see FIG. 2 (e)).

The functions of the apparatus provided with the hollow vessel-capacity changing means 7 having the solution discharge/charging valve 9 which extends from the hollow part of the vessel-capacity changing means toward the vessel 5 include the flow of the first liquid into the vessel-capacity changing means 7 via the solution discharge/charging valve 9 upon the insertion of the vessel-capacity changing means 7 in the vessel 5, resulting in the discharge of the first liquid from the vessel 5.

Further, when the second liquid is previously introduced in the vessel-capacity changing means 7, the functions of the above apparatus include the discharge of the first liquid from the vessel 5, followed by the charging of the second liquid from the vessel-capacity changing means 7 to the vessel 5 via the solution discharge/charging valve 9. Accordingly, the effect of the present invention can be exerted by the method comprising discharging the first liquid to outside the vessel 5 at the insertion of the vessel-capacity changing means 7 into the vessel 5 and subsequently lifting the vessel-capacity changing means 7 while charging the second liquid into the vessel 5 via the solution discharge/charging valve 9.

It is advantageous to render the maximum total volume of the part of the vessel-capacity changing means inserted in the vessel at least ½ of the volume of the immersing liquid employed for immersing the porous body, because the amount of the (N−1)th immersing solution remaining in the interstices defined by the porous body, the vessel-capacity changing means and the vessel can be relatively small to thereby ensure a high efficiency in the discharge of the (N−1)th immersing solution.

Effecting the following cleaning step during the above solvent replacement process is effective in further decreasing the effect of the small amount of the (N−1)th immersing solution remaining in the interstices defined by the porous body, the vessel-capacity changing means and the vessel.

The cleaning step comprises discharging an appropriate amount of the (N−1)th immersing solution from the vessel, followed by pouring of an appropriate amount of the Nth immersing solution into the vessel, thereafter operating the vessel-capacity changing means to mix the (N−1)th immersing solution and the Nth immersing solution so as to lower the ratio of the (N−1)th immersing solution, and again operating the vessel-capacity changing means to thereby discharge the mixture. The residual ratio of the (N−1)th immersing solution achieved by the above procedure is expressed by the formula:

(Residual Ratio of (N−1)th Immersing Solution)={Amount of Remaining (N−1)th Immersing Solution/[Amount of Remaining (N−1)th Immersing Solution+Amount of Nth Immersing Solution]}$^x$.

When the above procedure is repeated x times, the residual ratio decreases on the x-th power to thereby reduce the effect of the amount of the (N−1)th immersing solution.

It is preferred that the face of the vessel-capacity changing means be chamfered on the side of the porous body, or an elastic layer capable of absorbing shock be disposed on the vessel-capacity changing means, for avoiding the flawing of the porous body even when the vessel-capacity changing means is contacted with the porous body at the time of the vertical movement of the vessel-capacity changing means.

The elastic layer may be constituted by, for example, a fluid layer containing a gas or a liquid, disposed between the vessel-capacity changing means and the porous body, or by a porous material of organic polymer which swells by containing a liquid.

It is also advantageous to provide a side of the vessel with a guide adapted to prevent the movement of the porous body from a predetermined position thereof, for avoiding the accident of contact of the vessel-capacity changing means with the porous body. The movement preventing guide may be constituted by a coarse-mesh net ensuring easy flow of the immersing liquid therethrough, disposed so as to surround the porous body, or by several slender cylindrical rods built around the porous body, or by a ring, and is not particularly limited. It is desired that a suitable guide be provided, taking into account the configuration of the porous body, the number of porous bodies treated once, and other factors.

Similar effects can be exerted even when the vessel-capacity changing means is divided into a plurality of units.

Immersing liquid replacement can be performed without damaging the porous body by the use of the above immersing apparatus. In particular, the breakage ratio of porous gels produced by the sol-gel process has been high because of their weak gel skeletons. However, it can be markedly reduced by the use of the immersing apparatus of the present invention. Further, the amount of consumed immersing liquid is much smaller than in the use of the conventional immersing apparatus shown in FIG. 7, so that cost reduction can be attained.

Therefore, in the method for producing a functional glass or the like via a porous body, the employment of the porous body immersing apparatus of the present invention ensures not only minimization of the damaging of the porous body attributed to the solution replacement conducted in multiple-stage immersing treatment but also immersing the porous body safely, securely and at a lowered cost.

In another aspect of the present invention, there is provided a porous body immersing apparatus for use in a step of immersing a porous body in a liquid, which comprises:
  a vessel having a depth greater than the height of the porous body, in which the porous body is disposed and in which the immersing liquid is poured,
  means for pouring a solution onto a gel as the porous body when the porous body is disposed in the vessel, and
  a discharge port through which the immersing liquid is discharged, or
  means for transferring the porous body out of the vessel.

In connection with the above porous body immersing apparatus,
  i) the "solution" may be identical with the immersing "liquid",
  ii) when a first immersing liquid is changed to a second immersing liquid, the second immersing "liquid" may be used as the "solution",
  iii) when a first immersing liquid is changed to a second immersing liquid, the "solution" may be different from both of the first and second immersing "liquids", and
  iv) when a step change is conducted from immersion to drying, the "solution" may be different from the "liquid".

In a further aspect of the present invention, there is provided a method for producing a glass from a porous body, comprising a step of immersing a porous body in a liquid and a step of sintering the porous body, wherein between a step of immersing a porous body in a liquid and the subsequent step, a step is incorporated in which the porous body is transferred to the subsequent step while keeping part of the porous body having come out of the liquid wetted with a solution.

In still a further aspect of the present invention, there is provided a method for producing a glass from a porous body, comprising a step of immersing a porous body in a liquid and a step of sintering the porous body, wherein between a step prior to immersing a porous body in a liquid and the immersing step, a step is incorporated in which the porous body is transferred to the immersing step while keeping part of the porous body having come out of a liquid [porous body may be immersed in a liquid prior to the immersing step, and when the porous body is a wet gel, a liquid due to syneresis (particularly, solvent contained in sol+H$_2$O formed by hydrolysis) may be present in the gel] wetted with a solution.

In the above porous body immersing apparatus, the solution pouring means may comprise a port through which the immersing liquid is charged into the vessel.

Also, the above solution pouring means may be one adapted to cause the solution having come out of the means to flow on the surface of the porous body.

Further, the above porous body immersing apparatus may be one adapted to cause the solution to come out in showery or misty form around the porous body.

In the present invention, the porous body may be a gel produced by the sol-gel process.

In the above methods of the present invention, the liquid employed in the immersing step may be one capable of causing a component of the porous body to have a concentration distribution within the porous body.

Further, in the above methods of the present invention, the porous body may be a gel produced by the sol-gel process.

The functions of the above apparatus and methods according to the present invention will be described below.

The gel produced by the sol-gel process is impregnated with a solution such as alcoholic and aqueous solutions.

The effectiveness of the present invention is manifest in a step having the danger of a sudden solvent evaporation from at least part of the surface of a wet gel due to exposure to the outside air, which is, for example, (1) a step of withdrawing a gel from the mold employed in the gelation (followed by immersing of the gel in a solution, or by drying, gas treatment or the like without immersing), (2) a step of transfer from the solution of a given step to the solution of the subsequent step, or (3) a step of transfer from an immersing solution into a drying vessel.

In the above step, wetting of the surface of the wet gel prevents the cracking due to the sudden solvent evaporation.

The solvent of a given step adhering to the gel or the vessel can be washed away with the solution of the subsequent step, so that instabilization of the composition of the solution of the subsequent step can be prevented.

The surface of the gel may be wetted by a method in which a solution flows on the gel surface, or by a method in which the solution is made misty or showery around the gel.

In either of the methods, it is important that the positions, directions and number of solution charging nozzles be determined with the caution for preventing part of the gel having come out of the solution from drying, and also that the volume of the solution be determined in conformity with the purpose.

An appropriate method may be selected from the above, depending on the situation, for higher effectiveness. Illustratively, when only the effect of drying prevention is anticipated, the desired effect can be exerted only by spraying extremely fine misty liquid. Of course, instead, use may be made of a showery liquid.

For minimizing the volume of part of the solution of a given step which is mixed into the solution vessel of the subsequent step to thereby stabilize the immersing conditions, it is preferred that a solution be provided in an amount suitable for not only preventing the drying but also washing away the liquid adhering to the surface of the wet gel and caused to flow on the surface of the gel, irrespective of being misty or showery, to thereby also attain the washing of the solution of the given step with the solution of the subsequent step.

In the method for producing a gradient-refractive-index optical glass according to the sol-gel process, immersing in an acid or metal salt solution (known as "distribution-providing liquid") is performed as a step of inclining the concentration of a gel component to thereby form a refractive index distribution. In this step, for changing with the passage of time the composition distribution of the gel by means of the distribution-providing liquid, it is required that the liquid quantity, immersing time, etc. be strictly controlled to thereby stabilize optical properties. Liquid solubility and other parameters affected by the mixing of the solvent of the previous step and thus the optical quality such as distribution profile can be uniformed by washing away the adherent liquid simultaneously with the prevention of the drying of the surface of the wet gel.

The method of the present invention is effective in reducing the defective ratio attributed to the cracking caused by the too rapid drying which is likely to occur when the gel is impregnated with a solvent having a low surface tension, such as acetone, methanol and ether.

The liquid for use in wetting the surface of the gel is not particularly limited as long as it can keep the gel surface wet, and as long as it does not cause a sudden reaction to occur at its interface with the solution within the gel pores and does not break the gel skeleton by interfacial tension. The above liquid is, for example, an aqueous solution, an organic solution or a solution composed of a mixture thereof. This liquid is not necessarily identical with the immersing solution employed beforehand or afterward. However, when the employed solution is similar to the immersing solution employed beforehand or afterward, a good result is obtained in that the effect of the gel-surface wetting liquid on the gel composition can be reduced.

When the distribution of the metal salt component within the porous body has to be accurately controlled as in the production of a gradient-refractive-index optical glass, for example, in the above-mentioned step (1) or (2) followed by the immersing step, the employment of a liquid identical with the solution used in the subsequent immersing step is effective in avoiding the effect of the solution of the gel wetting step on the subsequent immersing to thereby contribute toward condition stabilization. However, in the step (2) followed by the immersing in a distribution-providing liquid, caution is needed because sometimes the wetting of the gel with the solution of the previous step having less impact on the distribution of the composition is preferred to the wetting with the distribution-providing liquid having greater impact on the distribution of the composition, from the viewpoint that the distribution profile is stabilized. The use of the solution similar to the immersing liquid employed beforehand or afterward may be advantageous.

When the wet gel has to be placed outside the solution for a prolonged period of time because of cutting work or time-consuming carriage, the surface of the gel may be wetted with a solvent having a high boiling point (polyhydric alcohol, diol, etc.) which is different from the immersing liquid employed beforehand or afterward.

Naturally, the method of the present invention is also effective in a step of transferring a gel from one of two provided solvent-filled vessels to the other.

Further, the method of the present invention may effectively be carried out with the use of a vessel provided with solution discharge means as shown in FIG. 8.

The apparatus shown in FIG. 8 comprises a vessel 35 for accommodating a wet gel 34, which has a peripheral wall provided at its lower part with a discharge port 36 for discharging a solution. This discharge port 36 is connected to the vessel 35 via a discharge valve 37. A solution charging nozzle 38 is disposed above the gel 34 accommodated in the vessel 35. The solution charging nozzle 38 is adapted to apply a showery solution to the gel 34 to thereby directly wet the gel 34. In FIG. 8, numeral 39 denotes a solution of a given step, and numeral 40 a solution charging pipe for charging a solution 41 of the subsequent step.

In the apparatus shown in FIG. 8, the level of the surface of the solution 39 is lowered with the discharge of the solution 39 of the given step placed in the vessel 35 to thereby cause upper part of the gel 34 to be exposed to the air, so that a misty or showery solution is charged through the solution charging nozzle 38. This prevents sudden drying of the gel 34. Thereafter, the solution 41 of the subsequent step is charged into the vessel 35.

The flow of the showery or misty solution should not necessarily be continuous, and may be intermittent.

The employment of the above apparatus and method of the present invention leads to prevention of the cracking of the wet gel due to sudden drying of the surface thereof during the immersing treatment of the wet gel with a relatively small amount of solution, so that the desired glass can be produced safely, securely and at a lowered cost.

Therefore, the present invention is advantageous in that, in the method for producing a glass via a wet gel, the cracking of the surface of the wet gel due to drying can be avoided with a small amount of solution in exposing the wet gel outside the solution, thereby stabilizing the product quality.

PREFERRED EMBODIMENT OF THE INVENTION

The present invention will now be described in greater detail with reference to the following Examples and Comparative Example, which should not be construed as limiting the scope of the invention.

Example 1

Figure 1A:
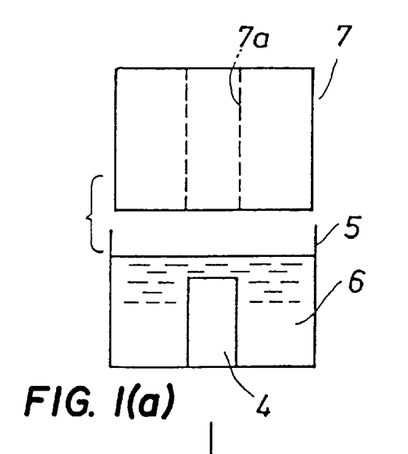
FIG. 1 is a step flow diagram outlining an immersing treatment process in which use is made of one form of immersing apparatus according to the present invention.
Figure 1B:
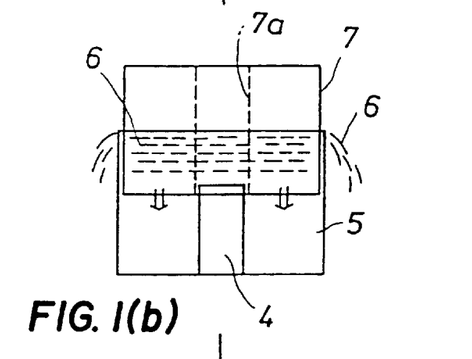
Figure 1C:
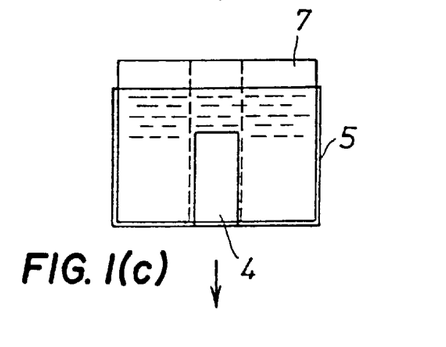
Figure 1D:
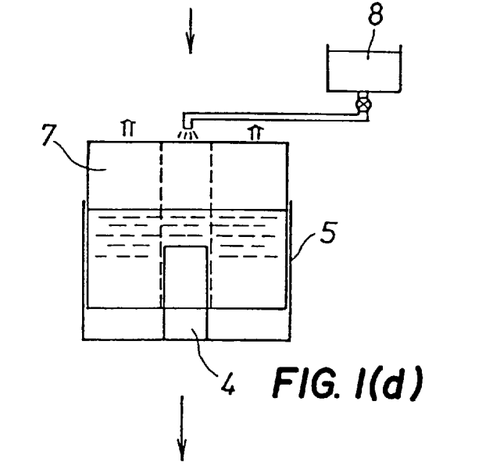
Figure 1E:
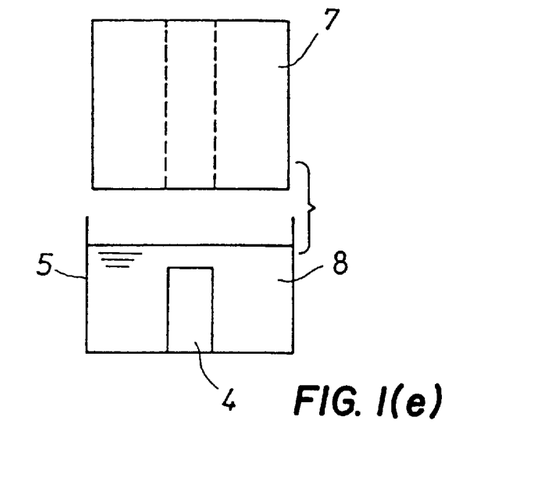
Figure 2A:
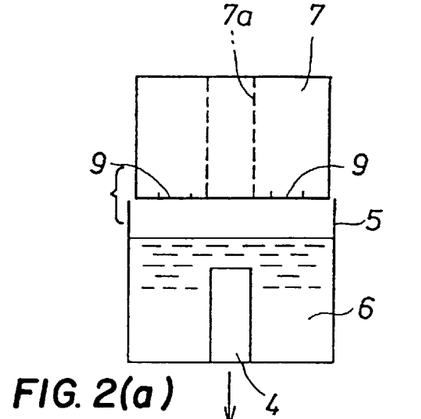
FIG. 2 is a step flow diagram outlining an immersing treatment process in which use is made of another form of immersing apparatus according to the present invention.
Figure 2B:
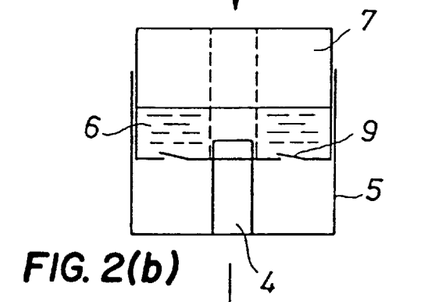
Figure 2C:
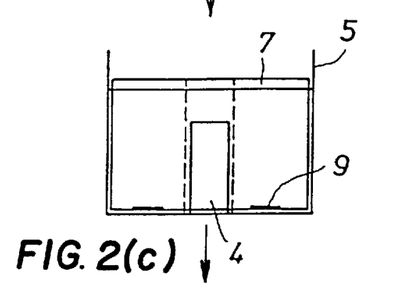
Figure 2D:
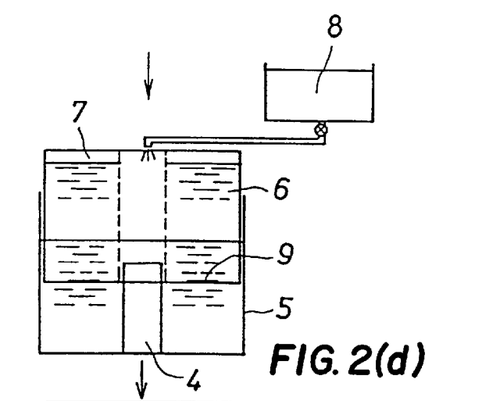
Figure 2E:
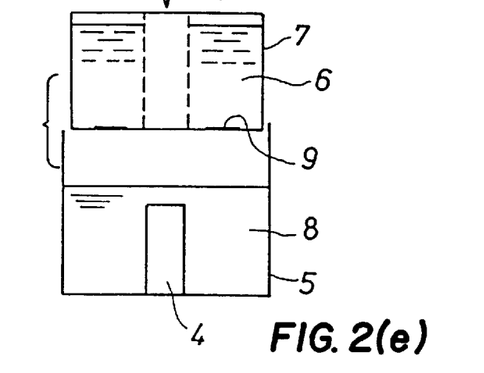
Figure 3:
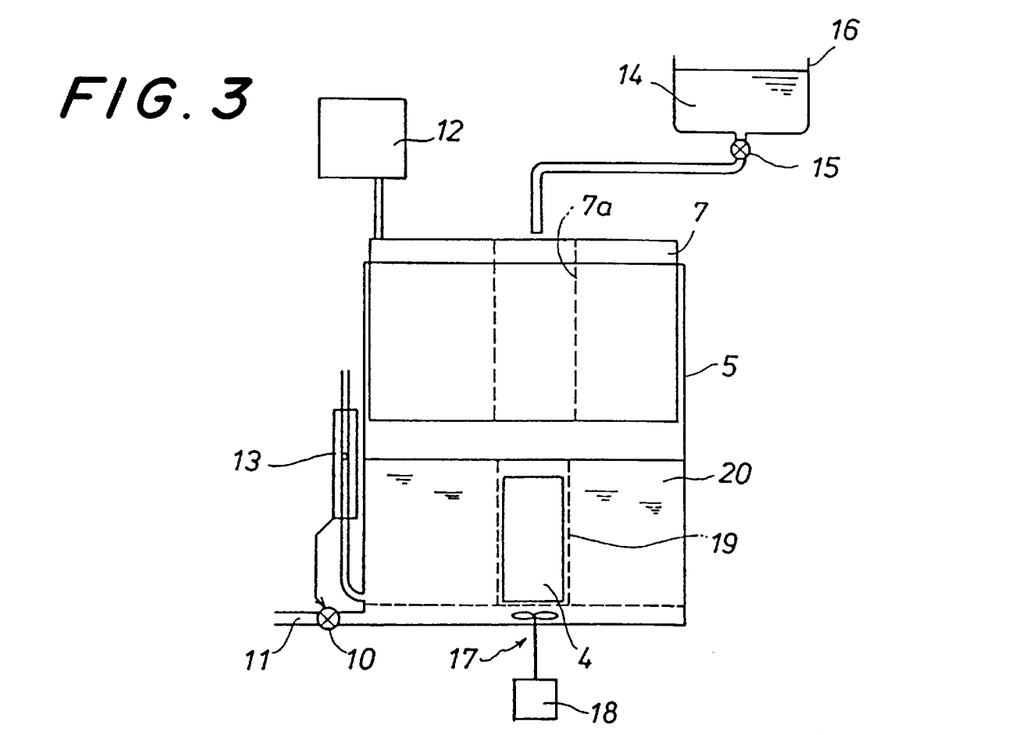
FIG. 3 is a schematic structural view of the immersing apparatus of the present invention, employed in Example 1.

A schematic diagrammatic view of the apparatus used in this Example is shown in FIG. 3.

A vessel 5 accommodating a porous body 4 is provided with a solution discharge port 11 having a valve 10 and a float switch 13 adapted to regulate a driving gear 12 capable of vertically moving a vessel-capacity changing means 7 to thereby control the liquid level. The volume of the immersing liquid put in the vessel 5 can be regulated by causing the float switch 13 to automatically open the valve 10 when the liquid level is higher than a given level and to automatically close the valve 10 when the liquid level is lower than the given level. The float switch 13 is also adapted to act on the driving gear 12 when the liquid level is higher than the given level in the pouring of the Nth immersing solution to thereby control the speed of the rise of the vessel-capacity changing means 7.

The Nth immersing solution 14 is charged from an upper container 16 provided with a valve 15. A stirrer 17 is disposed below the porous body 4 in order to uniform the concentration, temperature and other conditions of the whole of the immersing solution placed in the vessel 5. Numeral 18 denotes a motor.

The vessel-capacity changing means 7 is preferably sized to be so large as to contact the vessel 5 as long as it can vertically move in the vessel 5. The driving gear 12 is connected to the vessel-capacity changing means 7, so that the vessel-capacity changing means 7 can vertically move. If the porous body 4 is moved below the vessel-capacity changing means 7, the lowering of the vessel-capacity changing means 7 causes the porous body 4 to be crushed, so that a guide 19 surrounding the porous body 4 is disposed for preventing the move thereof. Thus, the diameter of the through hole 7a of the vessel-capacity changing means 7 is greater than that of the guide 19.

The procedure for multiple-stage immersing with the use of the immersing apparatus having the above construction will be described below.

(N-1)th immersing solution 20 is poured in the vessel 5, and thereafter the porous body 4 is put in the immersing solution 20. The (N-1)th immersing is conducted for an appropriate period of time, and then the vessel-capacity changing means 7 is slowly lowered into the immersing solution 20. The level of the surface of the immersing solution 20 rises due to the volume of the vessel-capacity changing means 7, so that the float switch 13 is actuated to thereby open the valve 10. As a result, the (N-1)th immersing solution 20 is discharged through the solution discharge port 11. The float switch 13 is preset so as for the porous body 4 not to be exposed above the liquid level depending on the height of the porous body 4, so that the discharge of the (N-1)th immersing solution 20 is completed at a point at which the surface of the immersing solution is located above the porous body 4.

The valve 15 of the upper container 16 is opened, so that the Nth immersing solution 14 is poured into the vessel 5 through the through hole 7a of the vessel-capacity changing means 7. The vessel-capacity changing means 7 is slowly lifted by the operation of the float switch 13 conducted in accordance with the pouring of the Nth immersing solution 14. Thus, the replacement of the immersing solution for the porous body 4 by the Nth immersing solution 14 is completed.

The immersing solution replacement can be accomplished without moving the porous body 4 and without exposing the porous body 4 to the air in the above entire process, so that the cracking of the porous body 4 during the process is avoided. That is, the immersing apparatus of this Example achieves immersing of the porous body 4 safely, securely and at a lowered cost, without damaging the porous body 4.

Example 2

Figure 4:
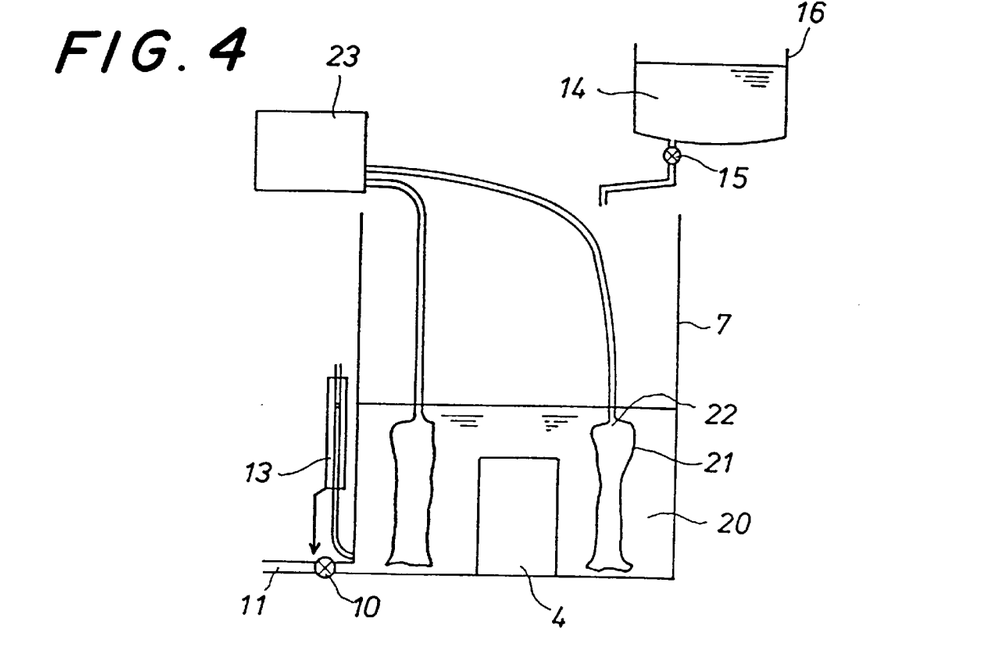
FIG. 4 is a schematic structural view of the immersing apparatus of the present invention, employed in Example 2.

A schematic structural view of the apparatus used in this Example is shown in FIG. 4.

In FIG. 4, the same part is denoted by the same numeral as in FIG. 3, and the description thereof is not repeated. In this Example as well, in order to keep the whole immersing solution uniform in the vessel 5, the apparatus is provided with a stirrer, which is, however, not shown.

This Example is characterized in that the volume of a vessel-capacity changing means 21 can be changed.

The vessel-capacity changing means 21 is made of Teflon having a thickness of 0.15 mm, and has at least one injection port 22 through which air can be charged. Air introduction and withdrawal are conducted by means of a pump 23 connected to the injection port 22. The vessel-capacity changing means 21 is inflated or shrunk to thereby attain a volume change.

The procedure for multiple-stage immersing with the use of the immersing apparatus having the above construction will be described below.

(N-1)th immersing solution 20 is poured in the vessel 5, and thereafter the porous body 4 is put in the immersing solution 20. The (N-1)th immersing is conducted for an appropriate period of time, and then the vessel-capacity changing means 21 in the form of a bag is slowly inflated by introducing air. Thus, the level of the surface of the immersing solution 20 rises, so that the float switch 13 is actuated to thereby open the valve 10. As a result, the (N-1)th immersing solution 20 is discharged through the solution discharge port 11. As in Example 1, the float switch 13 is preset so as for the porous body 4 not to be exposed above the liquid level depending on the height of the porous body 4, so that the discharge of the (N-1)th immersing solution 20 is completed at a point at which the surface of the immersing solution is located above the porous body 4.

The valve 15 of the upper container 16 is opened, so that the Nth immersing solution 14 is poured into the vessel 5.

Upon completion of the pouring of the Nth immersing solution 14, the air is withdrawn from the vessel-capacity changing means 21. After the withdrawal of the air, the vessel-capacity changing means 21 may be removed from the Nth immersing solution 14, or may be kept placed in the solution without any problem.

Thus, the replacement of the immersing solution for the porous body 4 by the Nth immersing solution 14 is completed.

The immersing solution replacement can be accomplished without moving the porous body 4 and without exposing the porous body 4 to the air in the above entire process, so that the cracking of the porous body 4 during the process is avoided. The degree of contact between the porous body 4 and the vessel-capacity changing means 21 can be controlled by regulating the introduced air, so that the vessel-capacity changing means 21 can be brought into closer contact with the porous body 4 than the vessel-capacity changing means 7 employed in Example 1. As a result, the amount of (N–1)th immersing solution 20 carried over can be minimized, thereby attaining efficient solution replacement. That is, the immersing apparatus of this Example also achieves immersing of the porous body 4 safely, securely and at a lowered cost, without damaging the porous body 4, as in Example 1.

Example 3

Figure 5:
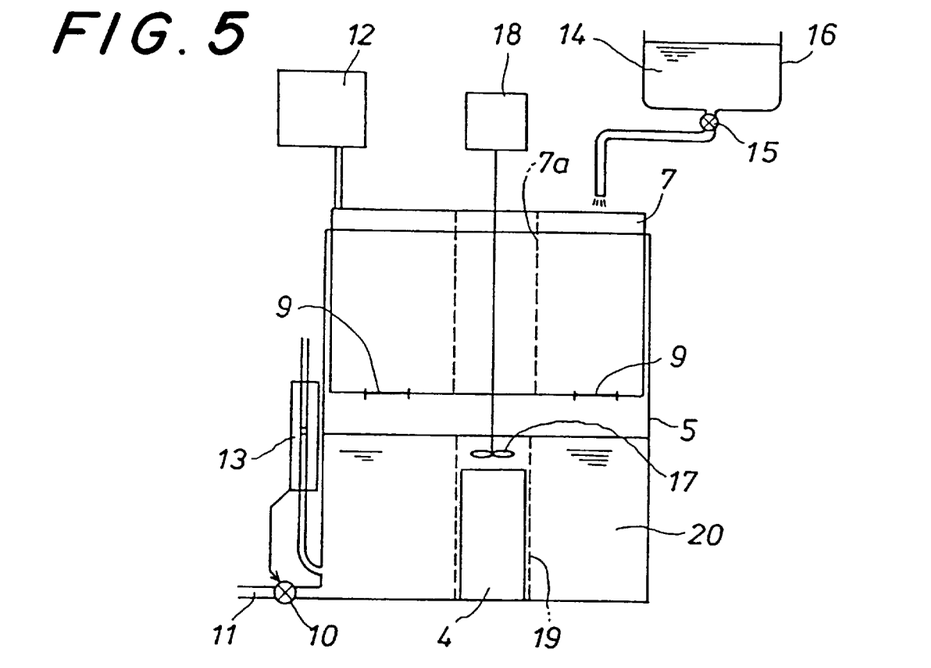
FIG. 5 is a schematic structural view of the immersing apparatus of the present invention, employed in Example 3.

A schematic structural view of the apparatus used in this Example is shown in FIG. 5.

In FIG. 5, the same part is denoted by the same numeral as in FIG. 3, and the description thereof is not repeated.

This Example is characterized in that the (N–1)th immersing solution 20 is discharged by the use of a vessel-capacity changing means 7 having the Nth immersing solution 14 introduced therein.

The bottom of the vessel-capacity changing means 7 is provided with a solution discharge/charging valve 9 which can freely be opened and closed to effect appropriate discharges of the Nth immersing solution 14 from the vessel-capacity changing means 7 into the vessel 5. The Nth immersing solution 14 is introduced in the vessel-capacity changing means 7 while keeping the solution discharge/charging valve 9 closed, and the vessel-capacity changing means 7 is lowered to thereby discharge the (N–1)th immersing solution 20 in the same manner as in Example 1. Thereafter, the solution discharge/charging valve 9 is opened, and the vessel-capacity changing means 7 is slowly lifted while keeping the solution discharge/charging valve 9 opened to thereby move the Nth immersing solution 14 contained in the vessel-capacity changing means 21 into the vessel 5. Thus, the completion of the lifting of the vessel-capacity changing means 7 means the completion of the immersing solution replacement.

The immersing solution replacement can be accomplished without moving the porous body 4 and without exposing the porous body 4 to the air in the above entire process, so that the cracking of the porous body 4 during the process is avoided. That is, the immersing apparatus of this Example also achieves immersing of the porous body 4 safely, securely and at a lowered cost, without damaging the porous body 4.

Example 4

Figure 6:
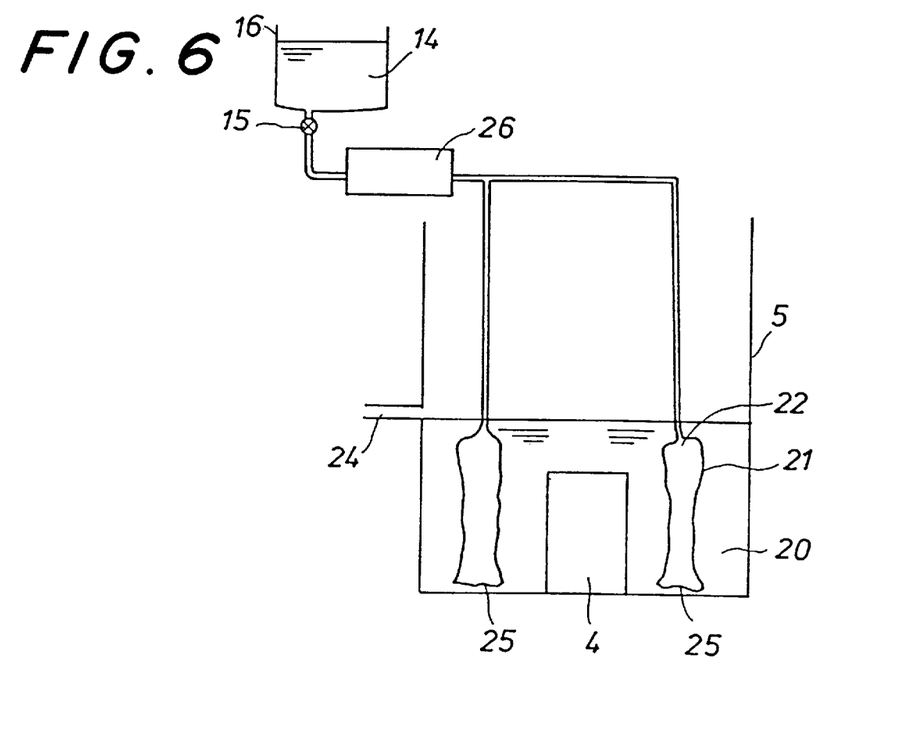
FIG. 6 is a schematic structural view of the immersing apparatus of the present invention, employed in Example 4.

A schematic structural view of the apparatus used in this Example is shown in FIG. 6.

In FIG. 6, the same part is denoted by the same numeral as in FIG. 4, and the description thereof is not repeated.

The vessel 5 accommodating the porous body 4 is provided with a solution discharge port 24 at a position higher than the height of the top of the accommodated porous body 4. In this Example as well, in order to keep the whole immersing solution uniform in the vessel 5, the apparatus is provided with a stirrer, which is, however, not shown.

This Example is characterized in that the (N–1)th immersing solution 20 is discharged by the introduction of the Nth immersing solution 14 into a vessel-capacity changing means 21 whose volume can be changed.

A solution discharge/charging valve 25 is provided which can freely be opened and closed to effect appropriate discharges of the liquid from the vessel-capacity changing means 21 into the vessel 5. Further, a pump 26 is interposed between a container 23 provided for charging the Nth immersing solution 14 and the vessel-capacity changing means 21 so that the Nth immersing solution 14 can be introduced into the vessel-capacity changing means 21. Thus, the immersing solution replacement is performed by means of the vessel-capacity changing means 21 whose volume is changeable.

Illustratively, the Nth immersing solution 14 is introduced in the vessel-capacity changing means 21 by means of the pump 26 to thereby inflate the vessel-capacity changing means 21, so that the (N–1)th immersing solution 20 is discharged through the solution discharge port 24 in the same manner as in Example 2. Thereafter, the solution discharge/charging valve 25 of the vessel-capacity changing means 21 is opened, and the vessel-capacity changing means 21 is slowly lifted while keeping the solution discharge/charging valve 25 opened to thereby move the Nth immersing solution 14 contained in the vessel-capacity changing means 21 into the vessel 5. Thus, the completion of the lifting of the vessel-capacity changing means 21 means the completion of the immersing solution replacement.

The immersing solution replacement can be accomplished without moving the porous body 4 and without exposing the porous body 4 to the air in the above entire process, so that the cracking of the porous body 4 during the process is avoided. That is, the immersing apparatus of this Example also achieves immersing of the porous body 4 safely, securely and at a lowered cost, without damaging the porous body 4.

In the above methods, the discharge of the immersing solution is performed by the vertical movement of the vessel-capacity changing means 7 or the change of the volume of the vessel-capacity changing means 21. Naturally, however, desired effects can be exerted even when these are combined.

Example 5

Figure 9:
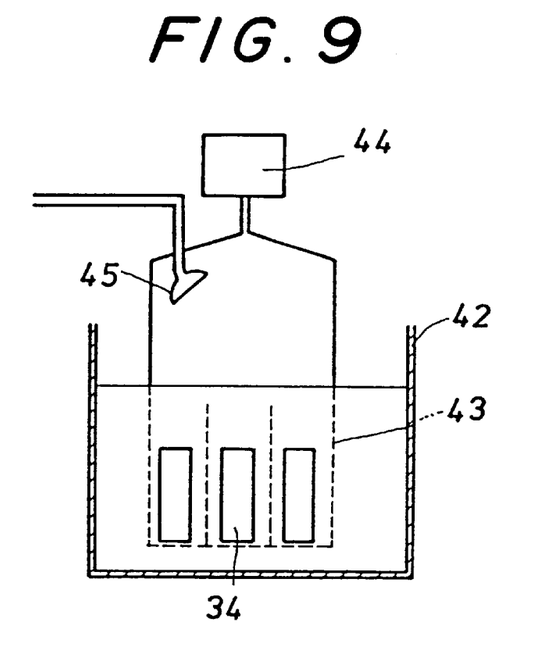
FIG. 9 is a schematic structural view of the apparatus of the present invention, employed in Example 5.

The immersing apparatus employed in this Example comprises a bath 42 adapted to accommodate an immersing solution, a basketlike vessel 43 having high liquid permeability and adapted to hold a wet gel 34, a driving gear 44 capable of driving the vessel 43, and an upper shower nozzle 45, as shown in FIG. 9.

A gel is produced by the sol-gel process, as follows. 40 ml of tetramethyl silicate and 40 ml of tetraethyl silicate are mixed together, and 28 ml of a pH 2 hydrochloric acid is added and stirred for 1 hr to thereby effect partial hydrolysis. A mixture of 110 ml of a 1.0 mol/l aqueous lead acetate solution and 25 ml of acetic acid is then added, and vigorously agitated. The resultant sol is dispensed in cylindrical containers with an inside diameter of 16 mm each in an amount of 12 ml, and allowed to stand still for gelation.

20 thus obtained gels are subjected to immersing treatment in a single vessel.

Illustratively, the above wet gels are removed from the containers, placed in the basketlike vessel 43, and together immersed in a solution of a mixture of isopropanol (IPA) having 0.5 mol/l lead acetate dissolved therein and water, placed in the bath 42. The immersing is conducted for 24 hr, and thereafter the basketlike vessel 43 is lifted above the solution. The basketlike vessel 43 having the wet gels placed therein is put in an immersing liquid (IPA) of the subsequent step while applying the immersing liquid of the subsequent step rendered showery by means of the shower nozzle 45 so that the surfaces of the wet gels are thoroughly and uniformly kept wet. The time for which the gels 34 are exposed above the immersing liquid for transfer is about 10 sec, during which about 20 ml of the immersing liquid of the subsequent step is applied to the gels.

Similar operation is conducted thrice in gel transfer for immersings in four immersing solutions. After the immersing in the fourth immersing solution, the gels 34 are dried, thereby obtaining 20 xerogels having no cracks. The xerogels are sintered, thereby obtaining glasses.

The above procedure is repeated to obtain glasses, whose composition proportions are found to have less dispersion by quantitative analyses of components of glasses of each lot.

Comparative Example

When the application of the solution from the shower nozzle 45 during the gel transfer is not conducted, 13.4 gels on the average, out of the 20 gels, suffer from surface cracks.

When the transfer time for the gels 34 is reduced to 2 sec for preventing the surface drying, no surface cracking occurs, but 5 gels out of the 20 gels suffer from edge chipping during the transfer operation. In this process, the amount of liquid carried over becomes an instability factor, and the dispersion of obtained glass composition proportions is about 2.5 times as large as that exhibited when the method of Example 5 is employed.

Therefore, it is apparent that the above method of the present invention is effective in preventing cracking during the gel transfer and thus stabilizing the quality.

Example 6

Figure 10:
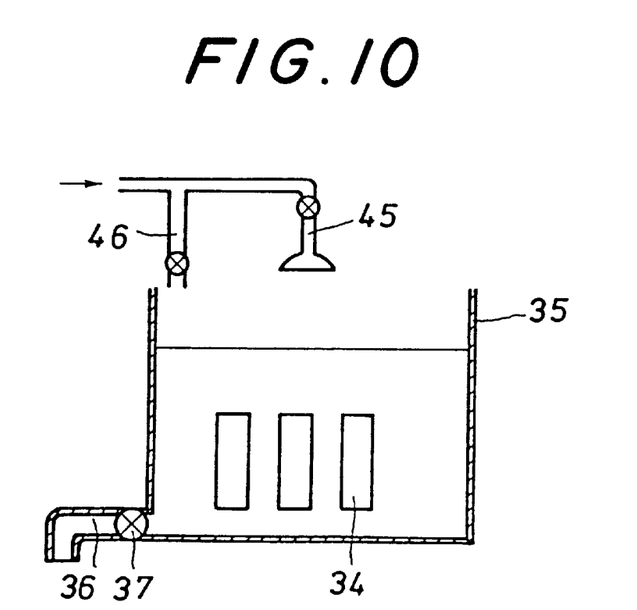
FIG. 10 is a schematic structural view of the apparatus of the present invention, employed in Example 6.

The immersing apparatus for use in this Example is as shown in FIG. 10. In the apparatus of FIG. 10, the same part is denoted by the same numeral as in the apparatus of FIG. 8, and description thereof is not repeated. In the apparatus of FIG. 10, a shower nozzle 45 is disposed above a vessel 35, and a pipe to which the shower nozzle 45 is connected is branched to provide a liquid charging port 46. The liquid charging port 46 is adapted to charge an immersing liquid of the subsequent step into the vessel 35.

In the same manner as in Example 5, 20 wet gels are produced according to the sol-gel process.

Obtained gels 34 are removed from the containers, placed in the vessel 35 accommodating the immersing solution, and immersing is conducted for 24 hr. Thereafter, a discharge valve 37 of the vessel 35 is opened, and the immersing solution is discharged through a discharge port 36. While the immersing solution is being discharged, the immersing solution of the subsequent step rendered showery by means of the shower nozzle 45 is applied to the gels so that upper parts of the gels having come out of the immersing solution are wetted by the showery solution to thereby prevent the drying of the gels. The above discharge of the immersing solution takes about 15 sec, and about 25 ml of the immersing solution is consumed to keep the gels 34 wet. After the complete discharge of the immersing solution, the discharge valve 37 is closed, and the immersing solution of the subsequent step is poured through the liquid charging port 46 so that the immersing solution is reserved in the vessel 35 for use in the subsequent step. Similar operation is conducted thrice to effect immersings in four immersing solutions. After the immersing in the fourth immersing solution, the gels 34 are dried, thereby obtaining 20 xerogels having no cracks. The xerogels are sintered, thereby obtaining glasses.

The above procedure is repeated to obtain glasses, whose composition proportions are found to have less dispersion by quantitative analyses of components of glasses of each lot, thereby demonstrating stable quality.

In this process, the solution of the previous step is completely discharged, so that the amount of consumed solution can be as small as about ⅓ of that exhibited in the continuous replacement with the solution of the subsequent step in which the apparatus of FIG. 7 is used, thereby ensuring advantages in cost reduction and waste fluid minimization.

Example 7

Figure 11:
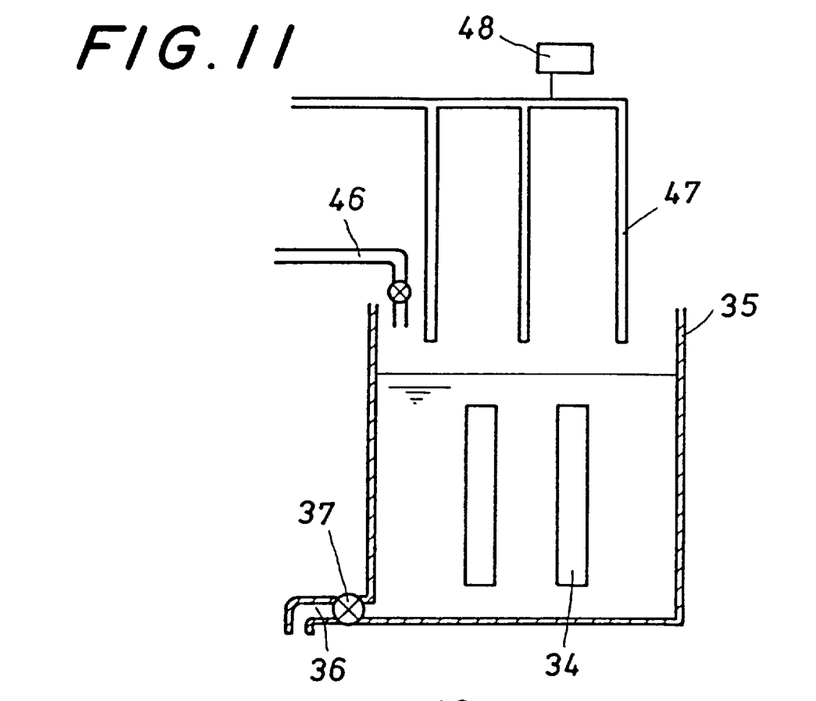
FIG. 11 is a schematic structural view of the apparatus of the present invention, employed in Example 7.

The immersing apparatus employed in this Example comprises a vessel 35 for immersing provided with a solution discharge port 36, three rod nozzles 47 adapted to cause a misty solution to surround gels 34, and a driving gear 48 therefor, as shown in FIG. 11.

According to the sol-gel process, 10 gels each having the same diameter and twice the length are produced in the same manner as in Example 5, and immersed in the vessel 35. Thereafter, a discharge valve 37 of the vessel 35 is opened to thereby discharge the immersing solution. While the immersing solution is being discharged, the rod nozzles 47 are lowered so as to be inserted around the gels 34, and the immersing solution of the subsequent step rendered misty by means of the rod nozzles 47 is applied to the gels so that upper parts of the gels having come out of the immersing solution are surrounded by the misty solution to thereby prevent the drying of the gels. The above discharge of the immersing solution takes about 50 sec, and about 25 ml of the immersing solution is consumed to keep the gels 34 wet. After the complete discharge of the immersing solution, the discharge valve 37 is closed, and the immersing solution of the subsequent step is reserved in the vessel 35 for use in the subsequent step. Similar operation is conducted thrice to effect immersings in four immersing solutions. After the immersing in the fourth immersing solution, the gels 34 are dried, thereby obtaining 10 xerogels having no cracks. The xerogels are sintered, thereby obtaining glasses.

The above procedure is repeated to obtain glasses, whose composition proportions are found to have less dispersion by quantitative analyses of components of glasses of each lot, thereby demonstrating stable quality.

In this process, also, the solution of the previous step is completely discharged, so that the amount of consumed solution can be as small as about ⅓ of that exhibited in the continuous replacement with the solution of the subsequent step in which the apparatus of FIG. 7 is used, thereby ensuring advantages in cost reduction and waste fluid minimization.

Example 8

This Example illustrates an exemplary production of a gradient-refractive-index optical glass.

Figure 12:
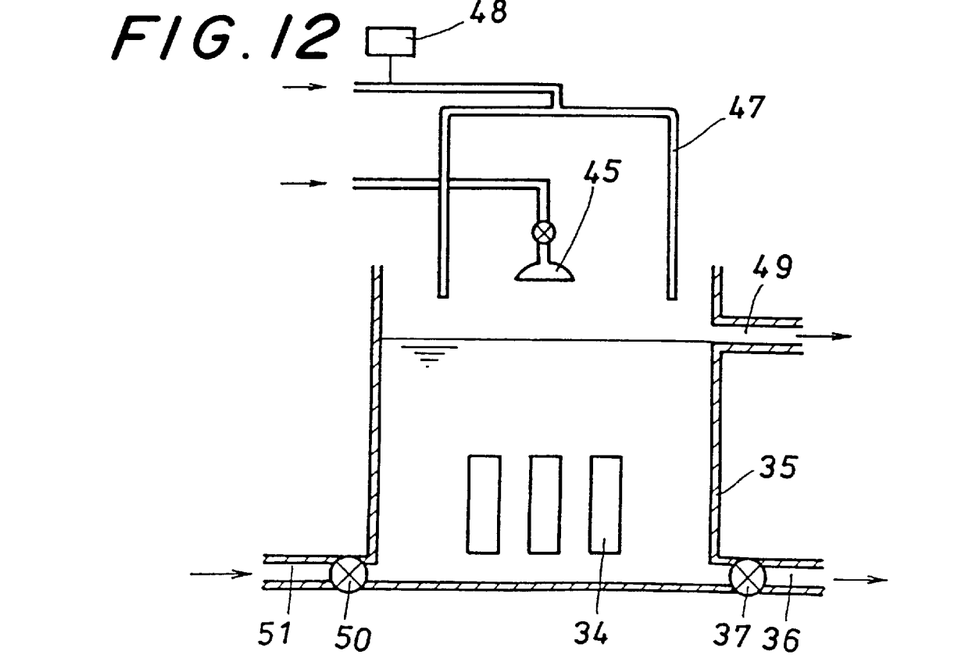
FIG. 12 is a schematic structural view of the apparatus of the present invention, employed in Example 8.

In this Example, use is made of the apparatus shown in FIG. 12. This apparatus is provided with not only a discharge port 36 disposed at a lower part of a vessel 35 but also an overflow pipe 49 disposed at an upper part of the vessel 35. Further, in the apparatus, a shower nozzle 45 and two rod nozzles adapted to vertically move by means of a driving gear 48 are provided above the vessel 35.

First, gels are produced in the same manner as in Example 5. The gels are treated in the immersing apparatus shown in FIG. 12. A first treatment liquid is a solution obtained by adding lead acetate to a mixture of isopropanol (IPA) and $H_2O$. The gels are immersed in the above solution for 40 hr, and a discharge valve 37 is opened to thereby discharge the solution. When the tops of the gels 34 are about to come out of the solution, application of a shower of IPA per se as a second immersing liquid is started through the shower nozzle 45 and the rod nozzles 47 lowered, so that the drying of the surface of each of the gels 34 can be prevented. After the completion of the discharge of the first immersing liquid, the discharge valve 37 is closed to fill the vessel with a second immersing liquid. That is, acetone (Ac) is continuously charged through a charging port 51 while discharging excess solution through the overflow pipe 49 to thereby gradually raise the ratio of Ac/IPA until the acetone content is finally 90% by weight.

Thereafter, in order to obtain a glass whose refractive index has a gradient, the above immersing liquid is discharged, and an ethanol solution of potassium acetate is introduced. This solution is called a distribution providing liquid. Before the immersing in the distribution providing liquid, the acetone ratio of the solvent system within the gels 34 is high, so that, when allowed to stand in the air, the solvent evaporation rate is high to thereby increase surface cracking likelihood. The drying of the surface of the gels 34 during liquid replacement is prevented by virtue of extremely fine misty acetone.

After immersing in the distribution providing liquid for 6 hr, the distribution providing liquid is discharged for replacement with a solution composed of a 5:5 mixture of IPA and Ac for fixing the distribution. In this replacement, a shower of the solution composed of a 5:5 mixture of IPA and Ac is applied in order to not only wash away excess distribution providing liquid adhering to the surface of the gels 34 but also prevent the drying of the gel surface. Thereafter, acetone (Ac) is continuously charged to thereby increase the ratio of Ac/IPA until the acetone content is finally 99% by weight.

The gels 34 are transferred to a drying oven for drying the same. This transfer is also conducted while surrounding the gels 34 with misty acetone for preventing the drying thereof.

The transferred gels 34 are dried and sintered to thereby obtain a gradient-refractive-index optical glass without cracking during the immersing treatment.

In the production of the gradient-refractive-index optical glass, not only product quality stabilization but also shortening of treating time and reduction of solution consumption can be attained by the solvent replacement as described in this Example.

Example 9

According to the sol-gel process, 100 ml of a solution composed of a mixture of methanol, water and ammonia is dropwise added to a mixture of 100 ml of silicon tetramethoxide and 50 ml of dimethylformamide, and agitated to obtain a sol. This sol is dispensed into cylindrical mold containers each having an inner diameter of 17 mm in an amount of 15 ml each, sealed with lids, and allowed to stand still for gelation. After the gelation, incubation in a thermostatic oven is conducted at 60° C. for 24 hr, and the lids are opened. While surrounding the gels with misty methanol, the gels are removed from the containers and transferred into a drying vessel. The drying vessel is put in the drying oven heated at 60° C., and the gels are dried while regulating numerical apertures. The resultant xerogels are sintered by heating up to 1200° C. to thereby obtain transparent quartz glasses.

It is found that the subject matter of the present invention as embodied in this Example can also be effectively applied to the removal of gels from their mold containers.

What is claimed is:

1. A method of immersing a porous body in liquids, comprising:

placing a porous body and a first liquid in a vessel, the first liquid being placed in an amount such that the porous body is wholly immersed in the first liquid;

discharging a portion of the first liquid of the vessel not brought into contact with the porous body from the vessel so that the amount of the first liquid of the vessel is reduced; and charging a second liquid into the vessel, wherein the porous body is a gel produced from a sol.

2. A method of claim 1, wherein the discharging of the first liquid from the vessel is performed by introducing a capacity changing unit of a given volume in the first liquid of the vessel.

3. A method of claim 2 wherein the capacity changing means has a part capable of liquid accommodation and is fitted with a valve, and wherein, in the second step, the second liquid is accommodated in the capacity changing means and the capacity changing means is introduced in the first liquid of the vessel, and, in the third step, the valve is opened so that the second liquid is charged in the vessel.

4. A method of claim 1 wherein the vessel at its position through which the first liquid is placed is fitted with capacity changing means whose volume is changeable, and wherein, in the second step, the first liquid discharging from the vessel is performed by increasing the volume of the capacity changing means.

5. A method of claim 4 wherein the capacity changing means has a hollow internal space and is fitted with a valve, and wherein, in the second step, the volume of the capacity changing means is increased by introducing the second liquid in the capacity changing means, and, in the third step, the valve is opened so that the second liquid is charged in the vessel.

6. A method of claim 1 wherein a second vessel is introduced in the first liquid, and wherein, in the second step, the first liquid discharging from the vessel is performed by transferring the first liquid into the second vessel.

7. A method of immersing a porous body in liquids, comprising:

placing a porous body and a first liquid in a vessel provided that the placement of the porous body may be preceded or followed by the placement of the first liquid, the first liquid being placed in an amount such that the porous body is wholly immersed in the first liquid;

discharging the first liquid from the vessel and simultaneously supplying the porous body with misty or showery liquid provided that the misty or showery liquid may consist of the first liquid or a second liquid; and charging the second liquid in the vessel, wherein the porous body is a gel product from a sol.

* * * * *